United States Patent [19]

Yeh

[11] Patent Number: 5,441,039
[45] Date of Patent: Aug. 15, 1995

[54] TEAPOT CAPABLE OF GIVING OFF SOUND WHILE IT POURS

[76] Inventor: Thomas Yeh, 10F, No. 97, Sec. 2, Nan-Gun Rd., Taipei, Taiwan

[21] Appl. No.: 303,822

[22] Filed: Sep. 9, 1994

[51] Int. Cl.⁶ ............................................. A47J 27/00
[52] U.S. Cl. ................................... 126/388; 126/344; 99/285
[58] Field of Search ................. 126/344, 388; 99/285; 431/125; 340/692; 220/23.83

[56] References Cited

U.S. PATENT DOCUMENTS

| | | | |
|---|---|---|---|
| 3,517,692 | 6/1970 | Elrod | 137/557 |
| 3,998,351 | 12/1976 | Smith et al. | 220/23.83 |
| 4,137,832 | 2/1979 | Lambros | 99/285 |
| 4,735,191 | 4/1988 | Boursse et al. | 126/388 |
| 4,813,368 | 3/1989 | Hutter, III et al. | 126/389 X |
| 4,857,897 | 8/1989 | Chen | 340/692 |

Primary Examiner—Larry Jones
Attorney, Agent, or Firm—Browdy and Neimark

[57] ABSTRACT

A teapot has a handle provided therein with a receiving space shielded with a cover. The receiving space is intended to house therein a battery set and a circuit board comprising a sound-reproducing control circuit which is in turn composed of an integrated circuit for storing electronically a predetermined sound. The circuit board further comprises a control circuit and an automatic touch-control switch. The control circuit is intended to drive the electronic signals so as to reproduce the sound via a loud speaker housed in the cover. The touch-control switch is intended to actuate automatically the sound-reproducing control circuit at the time when the handle of the teapot is tilted to pour tea.

4 Claims, 2 Drawing Sheets

TEAPOT CAPABLE OF GIVING OFF SOUND WHILE IT POURS

FIELD OF THE INVENTION

The present invention relates generally to a teapot, and more particularly to a teapot equipped with an electronic sound reproducing device.

BACKGROUND OF THE INVENTION

There are a variety of teapots, which are sold generally at the cut-throat prices. However, the price is not the only factor that determines the competitiveness of the teapots. In other words, a teapot must be provided with an added value so as to remain competitive in the market place.

SUMMARY OF THE INVENTION

It is therefore the primary objective of the present invention to provide a teapot with a handle having a concealed sound-reproducing device capable of making a clear and shrill sound while the teapot is pouring tea.

It is another objective of the present invention to provide a teapot with a compact sound-reproducing means capable of making automatically a clear and shrill sound while the teapot is pouring tea.

The foregoing objectives of the present invention is attained by a teapot, which has a handle provided therein with a receiving space shielded with a cover. The receiving space is used to house therein a battery seat and a circuit board comprising a sound-reproducing control circuit which is in turn composed of an integrated circuit for storing electronically a predetermined sound. The circuit board further comprises a control circuit and an automatic touch-control switch. The control circuit is intended to drive the electronic signals so as to reproduce the sound via a loud speaker. The touch-control switch is intended to actuate automatically the sound-reproducing control circuit at the time when the handle of the teapot is tilted to pour tea.

The foregoing objectives, structures, functions and features of the present invention will be more readily understood upon a thoughtful deliberation of the following detailed description of the present invention in conjunction with the accompanying drawings.

DETAILED DESCRIPTION OF THE INVENTION

Figure 1:
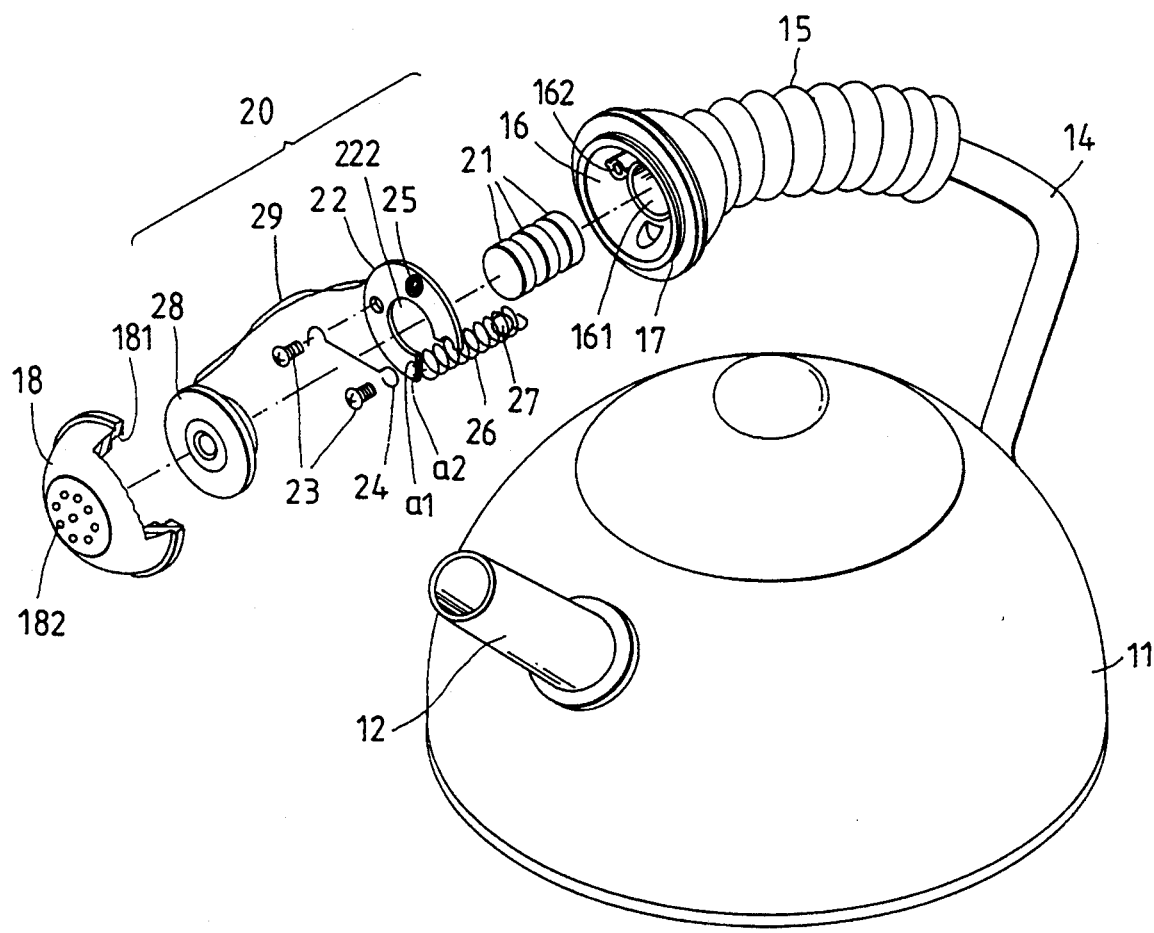
FIG. 1 shows an exploded view of a teapot embodied in the present invention.
Figure 2:
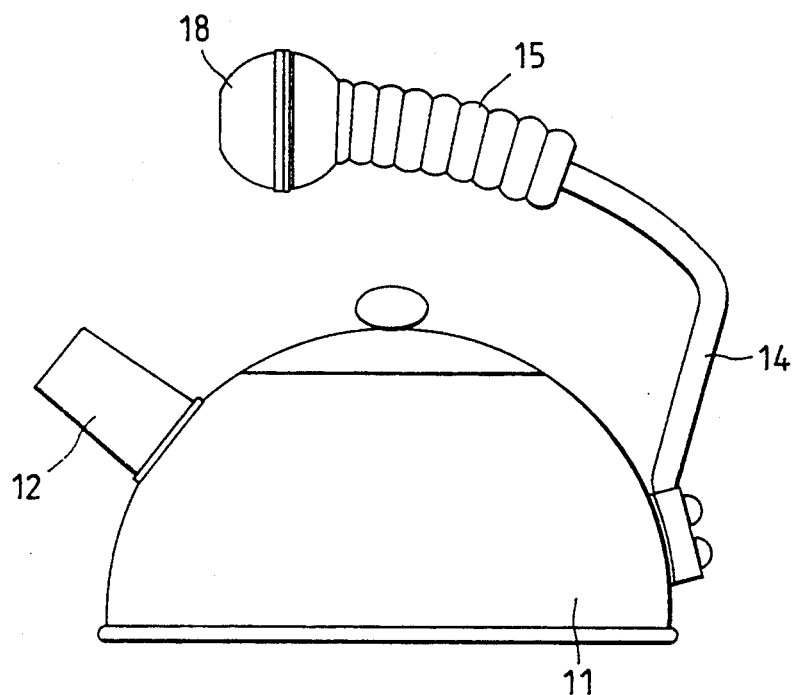
FIG. 2 shows a perspective view of the teapot in combination according to the present invention.
Figure 3:
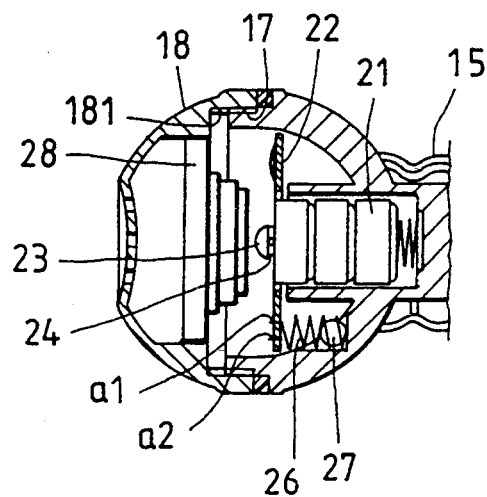
FIG. 3 shows an enlarged sectional view of a head portion of the handle of the teapot of the present invention.

As shown in FIGS. 1-3, the teapot of the present invention comprises a main body 11 and a spout 12. Fastened to the main body 11 is a curve hand grip 14 opposite in location to the spout 12. The hand grip 14 has a free end which is curved in the direction toward the spout 12 and is provided with a handle 15 attached thereto. The handle 15 is provided in the free end thereof with a receiving space 16 and a threaded portion 17. A sound-reproducing device 20 is housed in the receiving space 16 which is shielded with a cover 18 having inner threads 181 engageable with the threaded portion 17 of the handle 15. The cover 18 is provided with a plurality of pores 182 through which the sound waves are radiated into air.

The sound-reproducing device 20 comprises several batteries 21 which are disposed in a battery seat hole 161 of a cylindrical construction and located in the receiving space 16. The sound-reproducing device 20 further comprises a circuit board 22, a spring 26, a steel ball 27 and a loud speaker 28. The circuit board 22 is housed in the receiving space such that the circuit board 22 and a metal wire 24 are fastened with two connection rods 162 by two screws 23. The circuit board 22 is provided thereon with a sound-reproducing control circuit which comprises an integrated circuit element 25 for storing electronically a shrill sound, or a musical tune. The spring 26 is of a cylindrical construction and is welded at one end thereof on a circuit connection point a1 located on the circuit board 22 which comprises another circuit connection point a2 located at the center of the cylindrical spring 26. The steel ball 27 is disposed in the interior of the cylindrical spring 26 such that the steel ball 27 is capable of rolling back and forth in the interior of the spring 26. As the steel ball 27 is caused to roll to one end to make contact with the circuit connection point a2, which is then caused to become connected with the circuit connection point a1 via the steel ball 27 and the spring 26. In other words, the spring 26 and the steel ball 27 form a touch-control switch, which may be replaced with an equivalent switch such as a mercury switch. The loud speaker 28 is housed in the cover 18 such that the speaker 28 is connected with the sound-reproducing circuit of the circuit board 22 via two guide wires 29. As the circuit connection points a1 and a2 are connected by the steel ball 27 and the spring 26, the sound-reproducing circuit is then triggered to send out an electronic signal to the speaker 28 through which a predetermined shill sound of animals or a predetermined musical tune is made audible. Moreover, the battery set 21 has one end which is connected with the metal wire 24 via a round hole 222 located at the center of the circuit board 22. The metal wire 24 is fastened at both ends thereof by two screws 23 and is connected with the sound-reproducing circuit of the circuit board 22. the battery set 21 has another end which is connected with the sound-reproducing circuit by a guide wire.

Figure 4:
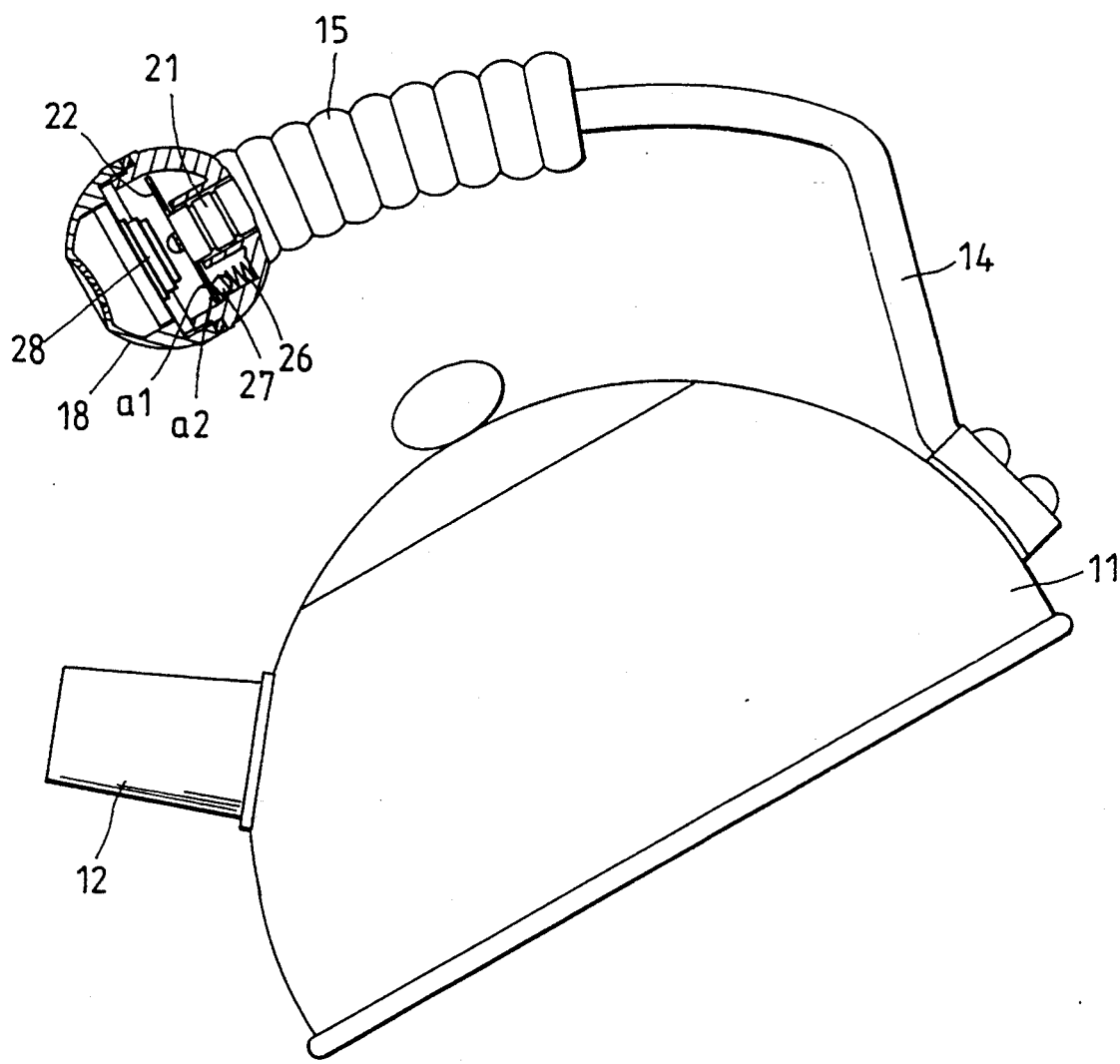
FIG. 4 shows a schematic view of the teapot at work according to the present invention.

As shown in FIG. 4, the spout 12 is caused to face downwards when the teapot of the present invention is so lifted as to pour tea. In the meantime, the steel ball 27 of the sound-reproducing device 20 is caused to roll downwards in the interior of the cylindrical spring 26 so as to make contact with the circuit connection point a2 of the circuit board 22. As a result, the circuit connection points a1 and a2 are in communication with each other via the spring 26 and the steel ball 27, thereby triggering the sound-reproducing circuit of the circuit board 22 to send out electronic signals which are stored in the integrated circuit 25. The electronic signals so transmitted are then converted by the loud speaker 28 into sound waves, which are radiated into the air via pores 182 of the cover 18. It is therefore conceivable that the teapot of the present invention is a fun thing to have.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A teapot comprising a main body for containing a drinking liquid, a spout, and a hand grip fastened to said main body such that said hand grip is opposite in location to said spout, said hand grip having a free end which is fastened with one end of a handle provided in a free end thereof with a receiving space shielded with a cover; wherein said receiving space is provided therein with a sound-reproducing device which comprises a circuit board provided thereon with a sound-reproducing circuit and a touch-control switch which is fastened on said circuit board and is provided with a rolling element capable of being caused to roll to make contact with said circuit board such that said rolling element causes two circuit connection points of said circuit board to become connected so as to trigger said sound-reproducing circuit to transmit a prestored electronic signal to a loud speaker by which said electronic signal is converted into a sound wave, said loud speaker being housed in said cover.

2. The teapot according to claim 1 wherein said touch-control switch comprises a biasing means of a cylindrical construction, and a steel ball, said biasing means having one end which is fastened by welding to one circuit connection point of said circuit board, said circuit board having another circuit connection point located centrally at a bottom end of said biasing means, said steel ball being housed in said biasing means such that said steel ball can be caused to roll to make contact with said circuit board so as to cause said two circuit connection points to be in communication with each other, thereby triggering said sound-reproducing circuit to transmit said electronic signal to said loud speaker.

3. The teapot according to claim 1 wherein said handle is provided therein with a battery seat hole for housing a predetermined number of batteries in communication with a conductive metal wire fastened to said circuit board.

4. The teapot according to claim 3 wherein said metal wire is fastened at both ends thereof by two fastening means to said circuit board which is in turn fastened to said reeiving space of said handle capable of being tilted to actuate said rolling element at the time when said spout is pouring said drinking liquid contained in said main body.

* * * * *